(12) United States Patent
Hershberger

(10) Patent No.: US 11,363,796 B2
(45) Date of Patent: Jun. 21, 2022

(54) GAME ANIMAL FEEDER CHUTE ASSEMBLY

(71) Applicant: Ray Hershberger, Middlefield, OH (US)

(72) Inventor: Ray Hershberger, Middlefield, OH (US)

( * ) Notice: Subject to any disclaimer, the term of this patent is extended or adjusted under 35 U.S.C. 154(b) by 213 days.

(21) Appl. No.: 16/537,798

(22) Filed: Aug. 12, 2019

(65) Prior Publication Data

US 2021/0045349 A1 Feb. 18, 2021

(51) Int. Cl.
*A01K 5/02* (2006.01)
*A01M 31/00* (2006.01)

(52) U.S. Cl.
CPC .......... *A01K 5/0225* (2013.01); *A01M 31/008* (2013.01)

(58) Field of Classification Search
CPC .. A01K 5/0216; A01K 5/0225; A01K 5/0233; A01K 5/0241; A01K 5/0258
See application file for complete search history.

(56) References Cited

U.S. PATENT DOCUMENTS

| | | | | |
|---|---|---|---|---|
| 1,355,399 A | * | 10/1920 | Kelley | E01B 5/08 119/57.91 |
| 1,440,875 A | * | 1/1923 | Howard | A01K 39/012 119/51.01 |
| 2,682,255 A | * | 6/1954 | Kleeman | A01K 39/014 119/51.01 |
| 4,989,547 A | | 2/1991 | Eaton | |
| 5,105,766 A | | 4/1992 | Montgomery | |
| 5,109,798 A | | 5/1992 | Impastato | |
| 5,170,749 A | | 12/1992 | Collie | |
| 5,201,279 A | | 4/1993 | Impastato et al. | |
| 5,307,760 A | | 5/1994 | Madigan et al. | |
| 5,555,843 A | * | 9/1996 | Harmon | A01K 5/0233 119/57.8 |
| 5,794,561 A | | 8/1998 | Schulz | |
| 6,082,300 A | | 7/2000 | Futch | |
| 6,920,842 B1 | | 7/2005 | Davis | |
| 7,370,605 B2 | | 5/2008 | Meritt | |

(Continued)

FOREIGN PATENT DOCUMENTS

| | | | | |
|---|---|---|---|---|
| CA | 2869095 A1 | | 5/2015 | |
| DE | 2446060 A1 | * | 4/1976 | ........... A01K 1/0356 |

OTHER PUBLICATIONS

Feedbank 300 Gravity Deer Feeder. https://banksoutdoors.com/product/feedbank-300/.

(Continued)

*Primary Examiner* — Ebony E Evans

(57) ABSTRACT

A deer feeder chute assembly is provided. The device may include a baseplate that may be attached to an aftermarket barrel or other container for holding animal feed. The baseplate may include a feed chute which may include a flange at one end for attachment to a chute opening in the baseplate. The flange and baseplate may include mounting apertures that cooperate with fasteners to attach the feed chute to the baseplate. A wall of the feed container may be interposable between the flange and the baseplate thereby attaching the chute assembly to the feed container. Openings may be made in the wall of the feed container to allow feed to communicate with the feed chute.

6 Claims, 4 Drawing Sheets

(56) References Cited

U.S. PATENT DOCUMENTS

| | | |
|---|---|---|
| 8,096,265 B1 | 1/2012 | Wisecarver |
| 8,573,156 B2 | 11/2013 | Gates |
| 9,480,239 B2 | 11/2016 | Worsley |
| 9,554,555 B2 | 1/2017 | Meritt |
| D787,751 S * | 5/2017 | Bosco .......................... D30/121 |
| 9,655,342 B2 | 5/2017 | Christie |
| 10,349,624 B2 * | 7/2019 | Worsley .................. A01K 5/01 |
| 10,897,873 B1 * | 1/2021 | Daigle ..................... A01K 1/10 |
| 2007/0163505 A1 | 7/2007 | Lynch |
| 2008/0115730 A1 | 5/2008 | Gray |
| 2008/0190370 A1 | 8/2008 | Coady |
| 2009/0056634 A1 | 3/2009 | Bodenstab et al. |
| 2012/0037079 A1 | 2/2012 | Rasmussen et al. |
| 2014/0069339 A1 | 3/2014 | Dettore |
| 2014/0174368 A1 * | 6/2014 | Salinas ................ A01K 5/0291 119/51.11 |
| 2015/0128867 A1 | 5/2015 | Keith |
| 2015/0272079 A1 | 10/2015 | Evans |
| 2016/0302383 A1 | 10/2016 | Frieden |
| 2017/0013803 A1 | 1/2017 | Teinert et al. |
| 2017/0035023 A1 | 2/2017 | Teinert et al. |
| 2017/0273275 A1 | 9/2017 | Gale et al. |
| 2017/0280677 A1 | 10/2017 | Young |
| 2017/0360002 A1 | 12/2017 | Bellow |
| 2018/0077898 A1 | 3/2018 | Winn |
| 2018/0184617 A1 | 7/2018 | Kohler et al. |
| 2018/0317449 A1 | 11/2018 | Landry |
| 2019/0099779 A1 * | 4/2019 | Farmer ................ A01C 17/001 |

OTHER PUBLICATIONS

TruStump 35-gallon Gravity Deer Feeder—http://www.trustump.com/purchase.html.

Boss Buck 350 Lb Feeders. https://www.bossbuck.com/350-lb-feeders/.

Boss Buck 4 Way Gravity Feeder Head. https://www.bossbuck.com/gravity-head-4-way/. https://www.bossbuck.com/gravity-head-4-way/.

Moultrie 55-Gallon Dinner Plate Feeder, https://www.moultriefeeders.com/55-gallon-gravity-tripod-feeder.

Texas Hunter Xtreme Protein Feeders. https://www.texashunterproducts.com/protein-feeders/?gclid=Cj0KCQiApbzhBRDKARIsAlvZue85ZzkMCBhjfgDZzezzPCtnl_AZ1bU5vNWt5tZjiG-FEeAuLvjAlsgaAoihEALw_wcB.

* cited by examiner

GAME ANIMAL FEEDER CHUTE ASSEMBLY

I. BACKGROUND OF THE INVENTION

A. Field of Invention

Embodiments of the invention may generally relate to domestic or wildlife feeders.

B. Description of the Related Art

Gravity-driven game animal feeders are well known to hunters for baiting game animals such as deer. It is advantageous to have a feeder that can operate unattended for long periods of time so that animals become accustomed to receiving food from the device, without requiring frequent attention from the hunter. Generally, gravity-driven feeders operate by placing pelletized or granular animal feed into a hopper and allowing gravity to draw the feed through the device to an outlet. The larger the hopper, the longer the feeder can be left unattended. The feed may be eaten from the outlet or it may be expelled and eaten from the ground.

A wide variety of game animal feeders are available; however, all have certain shortcomings. One problem is that known gravity-driven feeders tend to be very bulky because the feed hopper tends to be large. However, bulk tends to increase shipping costs and therefore tends to increase the retail price. Many of the feeders are one large piece, which makes them very inefficient for shipping purposes due to cargo space requirements. One attempt at reducing cost is to fabricate feeders from light materials like plastics. However, the costs savings from reduced weight can be lost by the increased costs of molding and finishing plastic goods. Metals may add less fabrication costs, but their weight tends to add to shipping costs thereby diminishing if not eliminating the costs savings. Another solution is to add electronic parts to meter out feed over time at scheduled intervals. This tends to require a smaller hopper because the feed delivery rate is better controlled. However, adding electronics and moving parts increases costs in materials, fabrication, and assembly. Moreover, increasing the complexity of the device tends to increase opportunities for failure. What is missing from the art is a modular feed chute assembly that can be readily installed by the end-user on an arbitrary aftermarket container.

Some embodiments of the present invention may provide one or more benefits or advantages over the prior art.

II. SUMMARY OF THE INVENTION

Embodiments of the invention may be directed to gravity driven game animal feeders that allow a feeder to operate unattended for long periods of time.

Some embodiments may relate to a feed chute assembly comprising: a baseplate having a first face and a second face opposing the first face; a first chute opening in the baseplate extending between the first face and the second face; a flange fastenable to the second-face of the baseplate and defining an input opening of the first chute; a chute extending from the flange and through the first chute opening; a feed output port disposed at an end of the chute opposing the flange, wherein the feed output port is in fluid communication with the input opening of the first chute; a first set of mounting apertures disposed in the baseplate about the first chute opening; a second set of mounting apertures disposed in the flange; and a plurality of fasteners co-operable with the first set of mounting apertures and the second set of mounting apertures to fasten the baseplate to the flange.

Another embodiment may relate to a feed chute assembly, comprising: a baseplate having a first face and a second face opposing the first face; a plurality of chute openings in the baseplate extending between the first face and the second face; a plurality of flanges corresponding in number to the plurality of chute openings and fastenable to the second-face of the baseplate, wherein each of the plurality of flanges defines and input opening; a plurality of chutes corresponding in number to the plurality of chute openings, the plurality of chutes extending from the flanges and through the plurality of chute openings; a plurality of feed output ports corresponding in number to the plurality of chute openings, the plurality of feed output ports being disposed at ends of the chutes opposing the flanges, wherein the feed output ports are in fluid communication with the input openings; a first set of mounting apertures disposed in the baseplate about each of the plurality of chute openings; a second set of mounting apertures disposed in each of the plurality of flanges; and a plurality of fasteners co-operable with the first set of mounting apertures and the second set of mounting apertures to fasten each of the plurality of flanges to the baseplate.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof, wherein like reference numerals indicate like structure, and wherein.

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

Figure 1:
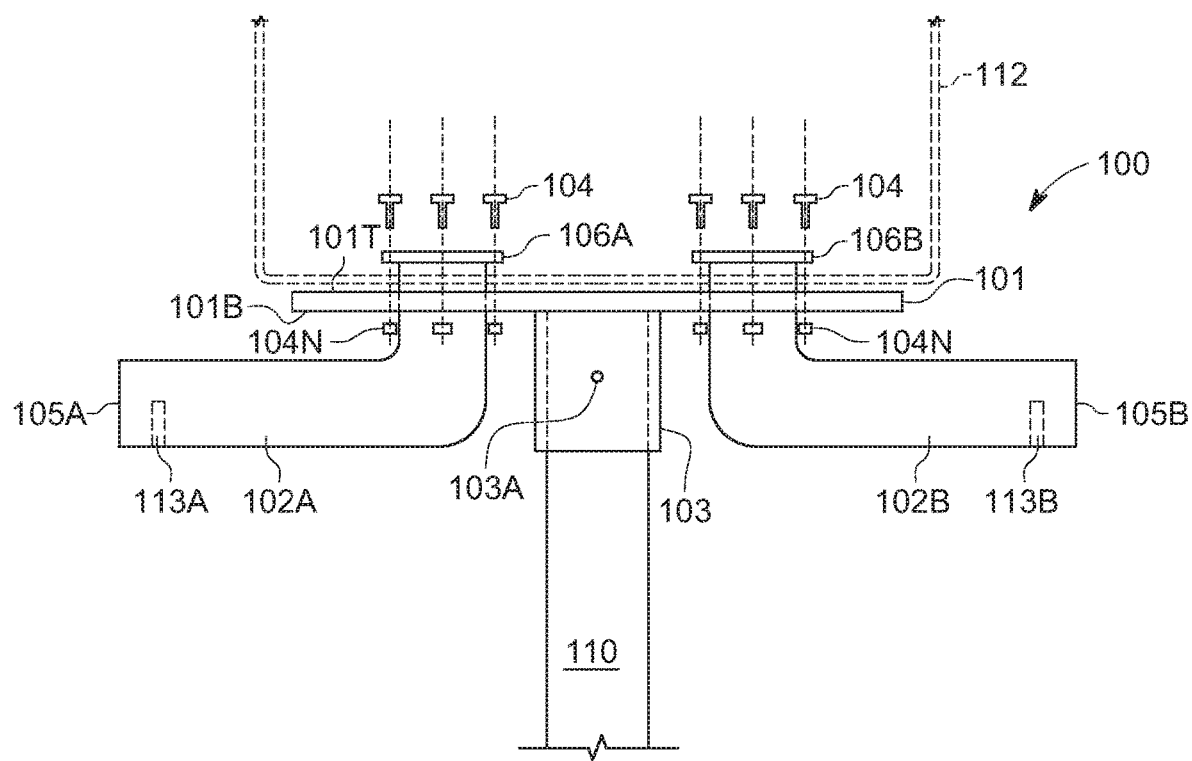
FIG. 1 is a semi-exploded sideview with certain portions transparent to show internal structures.

Referring now to the drawings wherein the showings are for purposes of illustrating embodiments of the invention only and not for purposes of limiting the same, FIG. 1 is a side view of a gravity-driven animal feeder chute assembly 100 according to one example embodiment of the invention. The embodiment includes a baseplate 101 with holes (not shown) formed therein to receive feed chutes. A pair of elbow-shaped feed chutes 102A, 102B are shown with flanges 106A, 106B at one end, and output ports 105A, 105B at the other end. The chutes 102A, 102B include optional dams 113A, 113B near the openings 105A, 105B. The dams 113A, 113B are located inside the chutes 102A, 102B, and serve to retain feed in the chute. In embodiments that include dams, the person having ordinarily skill will be able to readily size and locate the dams so that feed does not freely flow from the container while still allowing the game animal to feed directly from the openings 105A, 105B.

The chutes 102A, 102B are attached to the base plate 101 with fasteners, which in this embodiment are bolts 104 and nuts 104N; however, the person having ordinary skill will readily understand that a variety of fasteners are equally suitable including, without limitation, screws and rivets. A container 112 is interposed between the flanges 106A, 106B and a top face 101T of the baseplate 101, thereby mounting the embodiment 100 to the container 112. A stand bracket 103 is centrally located on the baseplate 101. In practice, a user of the illustrated embodiment would provide a feed container 112 with holes cut in the bottom sized to receive the chutes 102A, 102B. Moreover, the container would include mounting apertures surrounding the holes which cooperate with mounting apertures 109 of the flanges 106A, 106B and baseplate 101 to receive fasteners 104.

With continuing reference to FIG. 1, the bracket 103 is structured to receive a post 110 suitable for vertically supporting the assembly 100. For example, and without limitation, a suitable post may be fabricated by the user from 4×4 treated lumber. One or more walls of the bracket 103 may include an opening 103A which may receive a fastener (not shown) for attaching the bracket 103 to the post 110. The person having ordinary skill in the art will be able to readily select a fastener appropriate to a given embodiment; however, in the embodiment described here, a wood screw would be an appropriate choice provided the post 110 is wooden.

Figure 2:
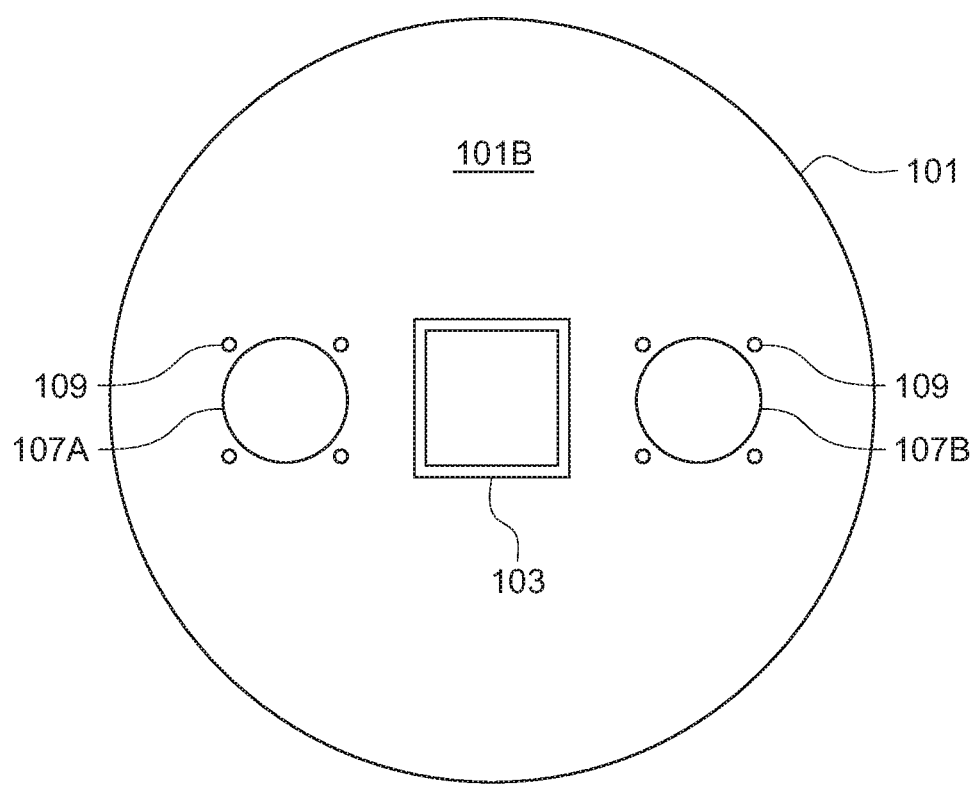
FIG. 2 is a bottom view of the baseplate of the embodiment illustrated in FIG. 1.

FIG. 2 is a bottom view of the baseplate 101 alone without chutes installed. The bottom face 101B of the baseplate 101 is shown. The bottom face 101B is also referred to herein as the first face. Moreover, structures disposed on first face 101B are said to be disposed on the first face side of the embodiment 100. The stand bracket 103 of this embodiment is a four-walled structure extending away from the bottom face 101B of the baseplate 101. The bracket 103 cooperates with a stand 110 such as, without limitation, a length of 4×4 treated lumber (see FIG. 1). One or more walls of the bracket may include an opening 103A (See FIG. 1) for receiving a fastener such as a wood screw or bolt to fasten the bracket 103 to the stand.

With continuing reference to FIG. 2, chute openings 107A, 107B are formed in the baseplate 101, and define through-holes extending from the bottom face 101B to the top face 101T. The chute openings 107A, 107B are sized to receive corresponding chutes 102A, 102B. The fit between the chute openings 107A, 107B and the chutes 102A, 102B is not critical, but a loose running fit may be advantageous for fabrication and assembly purposes. The chute openings 107A, 107B are proximal to mounting apertures 109 located about the perimeter of the chute openings 107A, 107B. The mounting apertures 109 cooperate with similar mounting apertures located on the flanges 106A, 106B and on the feed container 112 (see FIG. 1) to attach the chutes 102A, 102B and the feed container 112 to the baseplate 101.

Figure 3:
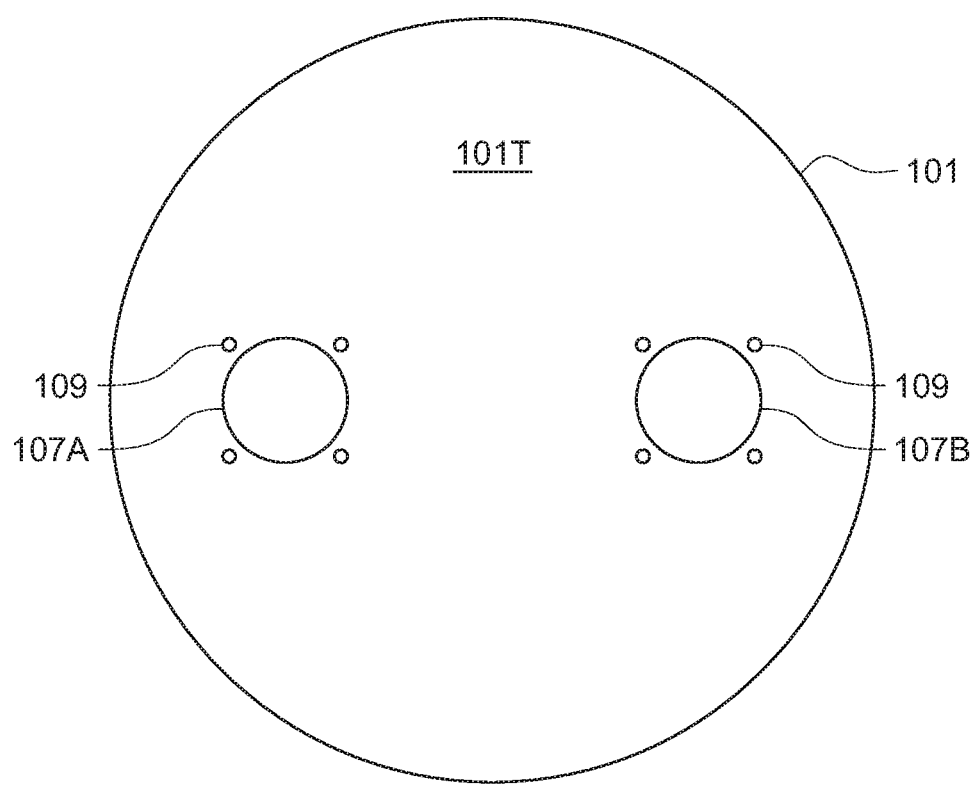
FIG. 3 is a top view of the baseplate illustrated in FIG. 2.

FIG. 3 is a view of the reverse side of the baseplate 101, namely the top face 101T which is also referred to herein as the second face. Moreover, structures disposed on second face 101T are said to be disposed on the second face side of the embodiment 100. FIG. 3 illustrates that the chute openings 107A, 107B and the mounting apertures 109 all define through-holes extending from the bottom face 101B to the top face 101T.

Figure 4:
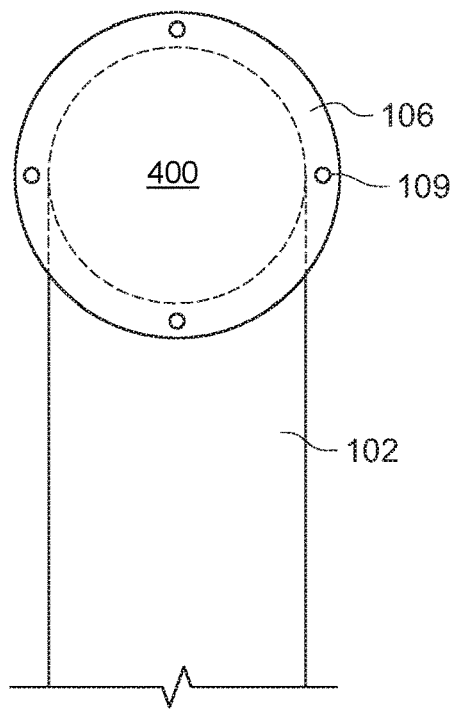
FIG. 4 is a plan view of a feed chute of the embodiment illustrated in FIG. 1 looking into the opening defined by the flange.

FIG. 4 is a view of a feed chute 102, which corresponds to both 102A and 102B. The view is directed perpendicular to the flange 106 and looking into an input opening 400 of the chute 102 defined by the flange 106. Mounting apertures 109 are shown about the perimeter of the flange 106. Similar to the mounting apertures 109 of the baseplate 101, the mounting apertures 109 of the flange 106 are sized to receive fasteners such as bolts 104 (see FIG. 1). Accordingly, the flange 106 is adapted to cooperate with the baseplate 101 in a fastened relation.

Figure 5:
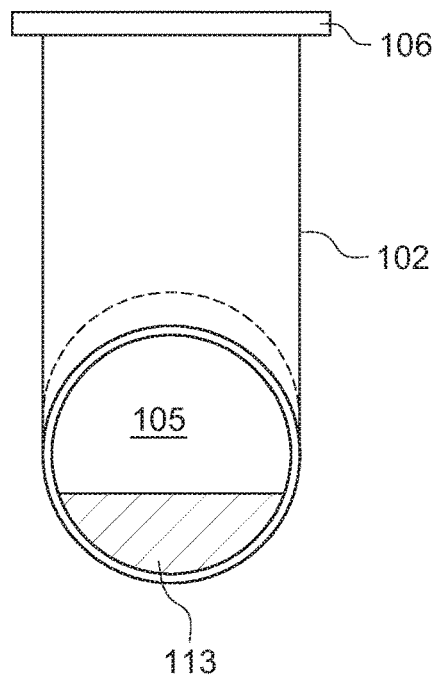
FIG. 5 is a view of the feed chute shown in FIG. 4 looking into the feed output port.

FIG. 5 is a view of the feed chute 102 looking into the feed output port 105. A semi-circular dam 113 is shown inside chute 102 near the output port 105. Although the dam 113 is shown as a solid wall, the invention is not limited in this way. Alternative dam structures can include, without limitation, a porous screen sized to allow feed to pass through the screen. Accordingly, the screen serves to provide resistance to flow of the feed while still permitting feed to pass through the screen as the embodiment is jarred, for instance, by an animal attempting to feed. Other dams 113 within the scope of the invention can include a forward-sloping wall which may provide resistance to flow of feed while still allowing the feed to flow as the embodiment is jarred by a feeding animal.

While the chutes 102A, 102B shown in FIGS. 1, 4 and 5 are all 90 degree elbows, the invention is not limited in this way. The invention is intended to include any suitable chute geometry for conveying feed from a container to a game animal. Such geometries can include, without limitation, an output port 105 angled slightly upward to retain feed, which may be used in conjunction with, or instead of, a dam 113. Alternatively, the output port 105 may be angled slightly downward to assist the flow of feed. Such geometries may be advantageously used in conjunction with a dam 113 structure as described elsewhere herein, which may prevent the container from immediately emptying.

The feed chute assembly 100 is co-operable with a wide variety of containers for holding animal feed. For instance, and without limitation, such containers can include plastic barrels, plastic trash cans, steel trash cans, 55 gallon steel drums, and so on. The specific nature of the container is not important, but it should include a suitably flat bottom surface to which may be attached the feed chute assembly 100. Advantageously, the container may include a closed top and sides to shield the animal feed from rain and snow, for instance. The user of the feed chute assembly 100 may cut out holes in the bottom wall of the container to communicate the contents of the container to the feed chutes 102A, 102B of the assembly 100, and may further drill mounting apertures around the holes to cooperate with complementary mounting apertures 109 of the flanges 106A, 106B and the baseplate 101.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

I claim:

1. A gravity-driven feed chute assembly, comprising:
   a baseplate having a first face and a second face opposing the first face;
   a first chute opening in the baseplate extending between the first face and the second face;
   a flange fastenable to the second-face of the baseplate and defining an input opening of a first angled chute;
   the first angled chute extending from the flange and through the first chute opening;
   a feed output port disposed at an end of the chute opposing the flange, wherein the feed output port is in fluid communication with the input opening of the first chute;
   a first set of mounting apertures disposed in the baseplate about the first chute opening;
   a second set of mounting apertures disposed in the flange;
   a plurality of fasteners co-operable with the first set of mounting apertures and the second set of mounting apertures to fasten the baseplate to the flange;
   a stand bracket centrally located on the first face of the baseplate, wherein the stand bracket is structured to receive a post to vertically support the baseplate.

2. The feed chute assembly of claim 1, wherein a wall of a feed container is interposed between the flange and the first face of the baseplate, and wherein the chute is in fluid communication with an interior of the feed container through one or more openings in the wall of the feed container.

3. The feed chute assembly of claim 1, further comprising a dam proximal to the feed output port.

4. A gravity-driven feed chute assembly, comprising:
   a baseplate having a first face and a second face opposing the first face;
   a plurality of chute openings in the baseplate extending between the first face and the second face;
   a plurality of flanges corresponding in number to the plurality of chute openings and fastenable to the second-face of the baseplate, wherein each of the plurality of flanges defines an input opening;
   a plurality of angled chutes corresponding in number to the plurality of chute openings, the plurality of angled chutes extending from the flanges and through the plurality of chute openings;
   a plurality of feed output ports corresponding in number to the plurality of chute openings, the plurality of feed output ports being disposed at ends of the chutes opposing the flanges, wherein the feed output ports are in fluid communication with the input openings;
   a first set of mounting apertures disposed in the baseplate about each of the plurality of chute openings;
   a second set of mounting apertures disposed in each of the plurality of flanges;
   a plurality of fasteners co-operable with the first set of mounting apertures and the second set of mounting apertures to fasten each of the plurality of flanges to the baseplate;
   wherein a wall of a feed container is interposed between the plurality of flanges and the second face of the baseplate, and wherein each of the plurality of chutes is in fluid communication with an interior of the feed container through one or more openings in the wall of the feed container.

5. The feed chute assembly of claim 4, further comprising a stand bracket centrally located on the first face of the baseplate, wherein the stand bracket is structured to receive a post to vertically support the baseplate.

6. The feed chute assembly of claim 4, further comprising a plurality of dams each being disposed proximal to a corresponding feed output port.

* * * * *